(12) United States Patent
Shahin et al.

(10) Patent No.: US 12,553,482 B2
(45) Date of Patent: Feb. 17, 2026

(54) BRAKE CARRIER HAVING AIR CHANNEL FOR AVOIDING DRAG TORQUE

(71) Applicant: HL MANDO CORPORATION, Pyeongtaek-si (KR)

(72) Inventors: Hatem Shahin, Pfaffenhofen (DE); Lothar Wagner, Simmern (DE); Kai Braun, Friedrichsdorf (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 398 days.

(21) Appl. No.: 18/119,548

(22) Filed: Mar. 9, 2023

(65) Prior Publication Data
US 2023/0287946 A1    Sep. 14, 2023

(30) Foreign Application Priority Data
Mar. 10, 2022 (DE) .......................... 102022202441.9

(51) Int. Cl.
*F16D 65/847* (2006.01)
*F16D 55/00* (2006.01)
*F16D 65/00* (2006.01)

(52) U.S. Cl.
CPC ......... *F16D 65/0056* (2013.01); *F16D 55/00* (2013.01); *F16D 2055/0008* (2013.01)

(58) Field of Classification Search
CPC .................. F16D 65/0056; F16D 55/00; F16D 2055/0008; F16D 65/092; F16D 65/847; F16D 2065/788; F16D 65/78
See application file for complete search history.

(56) References Cited

U.S. PATENT DOCUMENTS

| | | | |
|---|---|---|---|
| 6,719,105 B1 | 4/2004 | Wemple | |
| 10,422,393 B2 * | 9/2019 | Schmandt | F16D 65/0056 |
| 10,738,851 B2 * | 8/2020 | Smith | F16D 65/0068 |

(Continued)

FOREIGN PATENT DOCUMENTS

| | | | |
|---|---|---|---|
| DE | 102004052541 A1 | 5/2006 | |
| DE | 112015000202 T5 | 8/2016 | |

(Continued)

OTHER PUBLICATIONS

Office Action issued in corresponding German Patent Application No. 10 2022 202 441.9 dated Nov. 25, 2022.

*Primary Examiner* — Thomas W Irvin
(74) *Attorney, Agent, or Firm* — LEE, HONG, DEGERMAN, KANG & WAIMEY

(57) ABSTRACT

The invention concerns a Brake carrier (10) for disc brake arrangement (11), the disc brake arrangement (11) having brake pads (24) that are displaceable relative to a brake disc (100), wherein the brake carrier (10) is configured to support the brake pads (24) during their displacement; wherein the brake carrier (10) comprises at least a first portion (14) that is arrangeable on a first side (13) of the brake disc (100), a second portion (16) that that is arrangeable on a second side (15) of the brake disc (100) and two connecting portions (18, 20) each connecting the first and second portions (14, 16); wherein at least one of the connecting portions (18, 20) comprises an air channel (12) having a first end (34) that is arranged so as to face towards the brake disc (100). Also disclosed is a disc brake arrangement (11) comprising such a brake carrier (10).

8 Claims, 16 Drawing Sheets

(56) References Cited

U.S. PATENT DOCUMENTS

| | | | |
|---|---|---|---|
| 10,935,092 B2 | 3/2021 | Rocca-Serra | |
| 11,313,426 B2* | 4/2022 | Smith | F16D 65/847 |
| 2016/0123413 A1* | 5/2016 | Kincaid | F16D 55/226 |
| | | | 188/73.31 |
| 2018/0119762 A1* | 5/2018 | Smith | F16D 65/847 |
| 2020/0347899 A1* | 11/2020 | Smith | B60T 5/00 |

FOREIGN PATENT DOCUMENTS

| | | |
|---|---|---|
| FR | 3034831 A1 | 10/2016 |
| KR | 10-2011-0124839 A | 11/2011 |

\* cited by examiner

BRAKE CARRIER HAVING AIR CHANNEL FOR AVOIDING DRAG TORQUE

CROSS-REFERENCE TO RELATED APPLICATION

This application is based on and claims priority under 35 U.S.C. § 119 to German Patent Application No. 102022202441.9, filed on Mar. 10, 2022 in the German Patent and Trade Mark Office, the disclosures of which are incorporated herein by reference.

TECHNICAL FIELD

The invention relates to a brake carrier and to a disc brake arrangement comprising a brake carrier. The brake carrier and disc brake arrangement can be configured for use in a vehicle, in particular a road vehicle, such as a bus or a truck.

BACKGROUND

Disc brake arrangements are widely known for breaking wheels of a vehicle. They typically comprise brake pads that are displaceable to clamp a brake disc in between them. The displacement is achieved by an actuator, such as a hydraulic piston, that is typically supported in a brake caliper. The brake caliper is typically supported by a brake carrier that also receives and slidingly supports the brake pads. The brake caliper may be movable relative to the brake carrier. The brake carrier is usually fixed to an axle component of the vehicle end may generally be non-displaceable. The brake carrier and brake disc arrangement disclosed herein may likewise be configured according to any of these known principles. An example of a respectively known brake carrier can e.g. be found in KR 2011 124 839 A.

A problem with existing disc brake arrangements remains the occurrence of undesired drag torque. This is caused by a torque or, put differently, a brake action that occurs even though the brake is not activated. It results from a brake pad unintentionally contacting the brake disc, e.g. due to not being lifted off of said brake disc after braking. The letter is addressed in the prior art by providing pad springs having so-called resetting functions. Yet, this may be insufficient for reliably preventing all possible causes of drag torque and increases the complexity and costs of the pad springs.

SUMMARY

Therefore, it is an objective of the present invention to improve the efficiency and reliability of drag torque prevention in disc brakes at a limited complexity.

This object is solved by the subject matter according to the attached independent claims. Advantageous embodiments are defined in the dependent claims and in this description.

Accordingly, a brake carrier for a disc brake arrangement as suggested, the disc brake arrangement having brake pads (in particular a pair of brake pads) that are displaceable relative to a brake disc coupled to a vehicle wheel. The brake carrier is configured to support the brake pads during their displacement, and in particular to slidingly support them.

The brake carrier comprises at least a first portion that is arrangeable on a first side of the brake disc, a second portion that that is arrangeable on a second side of the brake disc and two connecting portions each connecting the first and second portions. At least one of the connecting portions comprises an air channel (abbreviated: channel) having a first end that faces towards the brake disc. This may e.g. be achieved by said first end being positioned in a first face, side or region of the connecting portion that is oriented towards and/or faces the brake disc.

The above solution is based on the realisation that a further cause for the occurrence of drag torque is an aerodynamic suction force that is exerted by the rotating brake disc on a brake pad. This suction force may suck the brake pad towards and into contact with the brake disc, even though the brake is not activated. The prior art fails to acknowledge this cause and does not provide any solution thereto.

Yet, with the suggested brake carrier, it is possible to limit or even prevent such aerodynamic suction forces from occurring. Specifically, it has been found that the provision of a respective air channel helps to alter the local air pressure distribution so as to limit or prevent said aerodynamic suction forces.

According to some embodiments, this is achieved by the channel locally increasing pressure near the gap between the brake disc and brake pad that is formed when the brake is inactive.

The first and second portion as well as the connecting portions of the brake carrier may be dimensioned and/or arranged relative to one another according to known solutions. For example, they may be arranged in a rectangular and in particular frame-like manner with each of the connecting portions and first and second portions forming a side of said rectangle and/or frame. Additionally or alternatively, they may at least partially confine a space (e.g. a circumference thereof) that is configured to receive at least part of the brake disc.

The first and second portion may extend in parallel to one another. The connecting portions may extend in parallel to one another. The connecting portions may each extend at an angle to the first and second portion, in particular an angle of approximately 90°. Any of the first and second portion and connecting portions may be elongated.

The first and second portion may each extend along and/or be positioned opposite to side faces of the brake disc. The connecting portions may e.g. extend at an angle to said side faces. The connecting portions may extend across and/or be positioned opposite to a circumferential face of the brake disc. They may span from one side face of the brake disc to another side face of the brake disc.

The brake disc may rotate about a rotation axis. References to axial, radial and circumferential directions may generally refer to said rotation axis, with radial extending at an angle and in particular orthogonally to said axis and circumferential extending around or about said axis.

The first portion may also be referred to as inboard portion and the second portion may also be referred to as outboard portion, or vice versa. The term "inboard" may indicate a closer proximity to a centre of the vehicle. The term "outboard" may indicate a larger distance to said centre and/or a closer (in particular axial) proximity to a rim of the vehicle wheel.

The brake carrier may comprise guiding portions, in particular guiding recesses, in which brake pads and in particular known lateral guiding projections thereof are receivable. The brake carrier may comprise at least one fixing portion for being fixed to an axle knuckle.

The channel may have a length of several centimetres, e.g. at least 5 cm or at least 10 cm. A width or diameter of the first end (and of an optional second end discussed below) may not be larger than a length of the channel. For example, it may be smaller than 5 cm and/or larger than 5 mm. The channel may have a width or diameter of at least 1 cm. Said width or diameter may be continuous or may vary along a length of the channel.

The first end and/or the optional second end may comprise or form an access of the channel to the outside, e.g. an opening. This access and/or opening may have a closed or open circumference. In the latter case, the access may e.g. form an end or edge of a recess within a surface of the brake caliper, said recess forming at least a section of the channel. Additionally or alternatively, the access to the channel having an open circumference may be formed by an end of the channel with a surrounding surface level of the brake caliper.

Generally, the channel may define a hollow or free space within a volume or a surface of the brake carrier. Open or closed walls and/or circumferential surfaces of the channel may guide an air stream entering through the first end along the channel. Said air stream may be generated by the rotating disc.

In one example, a plurality of channels may be provided at the same side or face of the connecting portion. The first ends of said channels (and the channels in general) may be axially spaced apart and/or the channels may not cross one another. One of these first ends may be positioned closer to an inboard side of the brake carrier and/or closer to the brake carrier's first portion. The first end of the other channel may be positioned closer to an outboard side and/or closer to brake carrier's second portion.

Additionally or alternatively, there may be two brake pads, one at each side face of the brake disc. An (air) gap may be formed between each brake pad and a respectively opposite side face when the brake is not active. When two channels are provided (particular at the same face of the connecting portion) the first end of the first channel may be positioned adjacent to one of these gaps, and the first end of the second channel may be positioned adjacent to the respective other one of these gaps.

The channel may be opened to the outside along a majority of its length or its complete length, i.e. may have a non-closed circumference. For example, at least a section of the channel may be configured as a groove or recess in a surface of the brake carrier. Said groove may extend along the surface, thus forming an elongated recess and/or indentation within said surface. Yet, this groove may not have a closed circumference or cross-section.

Providing a respective groove or recess may be simple to produce, while still reliably providing the desired anti-suction effect. For example, the channel and in particular the groove may be directly produced during casting of the brake carrier. Additionally or alternatively, forming the channel may include subsequent machining operations.

According to further embodiment, the channel may be closed to the outside along a majority of its length or its complete length, i.e. may have a closed circumference or cross-section. For example, at least a section of the channel may have a closed circumferential surface, thus e.g. being configured in a tunnel-like manner. Again, such a hollow and/or tunnel-like channel may be produced directly during casting or by machining.

Generally, the brake carrier can be produced by metal casting or by generative and/or additive manufacturing technologies, such as 3D-printing or selective laser melting. The latter may allow for almost arbitrary shapes and dimensions of the channel. Alternatively, the brake carrier may comprise a separate parts that are fixed to one another while defining at least a section of the channel in between them.

According to one example, a cross-section of the channel decreases towards the first end. For example, the first end may define a smallest cross-section of the channel. A section comprising said first end may have a larger cross-section at a distance to said end. In one example, the cross-section of the channel increases at a distance to the first end, in particular continuously increases, and/or does not decrease relative to first end and at a distance thereto. Reducing the cross-section of the first end accordingly helps to reliably provide the desired anti-suction effect.

In a further development, the first end is positioned adjacent to (or, put differently, positioned opposite to or in line with) a gap between the brake pad and brake disc. Said gap may also be referred to as an air gap. It may be the gap that is formed between the brake pad and brake disc when the brake is inactive. Said gap may be closed by displacing the brake pad during braking. The respective position of the first end may include positioning said end in a (virtual) spatial plane extending along and/or within said gap. By placing the first end accordingly, a proximity of the generated pressure distribution to the gap is increased, thereby increasing reliability of the generated anti-suction effect.

According to a further embodiment, the channel has a non-straight course, in particular an angled course. For example, the channel may be elongated, but not straight. Rather, it may extend in a curved or angled manner. This way, the velocity of air flowing along the channel can be affected to create the desired pressure distribution. In one example, the channel is shaped to guide air away from the first end and/or brake disc. For example, the first end may form a first opening of the channel and a second end may be at a greater axial or radial distance to the brake disc than the first end.

The channel may have a second end not facing the brake disc. For example, the second end may be provided in a second face of the connecting portion, wherein said second face does not face the brake disc, but e.g. faces away therefrom. The first and second end may be fluidically connected by the channel. The second end may be larger than the first end, e.g. at least 1.5 times as large. For example, the connecting portion may have an inner side facing the brake disc and an outer portion facing in an opposite direction.

Further, it may have an upper side and lower side facing opposite directions and connecting the inner and outer portion. The lower side may be closer to a circumferential face of the brake disc and the upper side. The upper and lower side as well as the inner and outer side may each form a side of a cross-section of the connecting portion. The cross-section may be substantially rectangular (but may e.g. have rounded corners).

In a further example, the channel has a second end facing towards the brake disc by e.g. being located in a same first face of the connecting portion as the first end. The first and second end may be fluidically connected by the channel. Again, said second end may be larger than the first end, e.g. at least 1.5 times as large. According to this example, air may be guided from the first to the second end while remaining at, within or at least close to the same first face. For example, the air may be guided in a U-like manner, the channel having a respective U-shape or course when extending from the first to the second end. Any faces of the brake carrier may also be referred to as sides of the brake carrier.

According to a further embodiment, a cross-section of the channel increases towards the second end. For example, a section of the channel comprising the second end may have a cross-section at said second end that is larger than a cross-section (of said same section) at a distance to said second end. In one example, the cross-section of the channel increases from the first end to the second end, in particular continuously increases, and/or does not decrease from the first end to the second end. Providing a respectively increasing cross-section of the second end is beneficial with regard to creating the desired pressure distribution.

The invention also relates to a disc brake arrangement, comprising:
- a brake carrier according to any of the aspects disclosed herein;
- a pair of brake pads slidingly supported by the brake carrier;
- a brake disc to be braked by the brake pads.

The disc brake arrangement may comprise any further components described herein. For example, it may comprise a brake caliper. Further, it may comprise an actuator for displacing the brake pads, said actuator e.g. being mounted to the brake caliper.

BRIEF DESCRIPTION OF DRAWINGS

Embodiments of the invention are described below with respect to the appended schematic figures. Same features may be marked with the same references throughout the figures.

DETAILED DESCRIPTION

Figure 1:
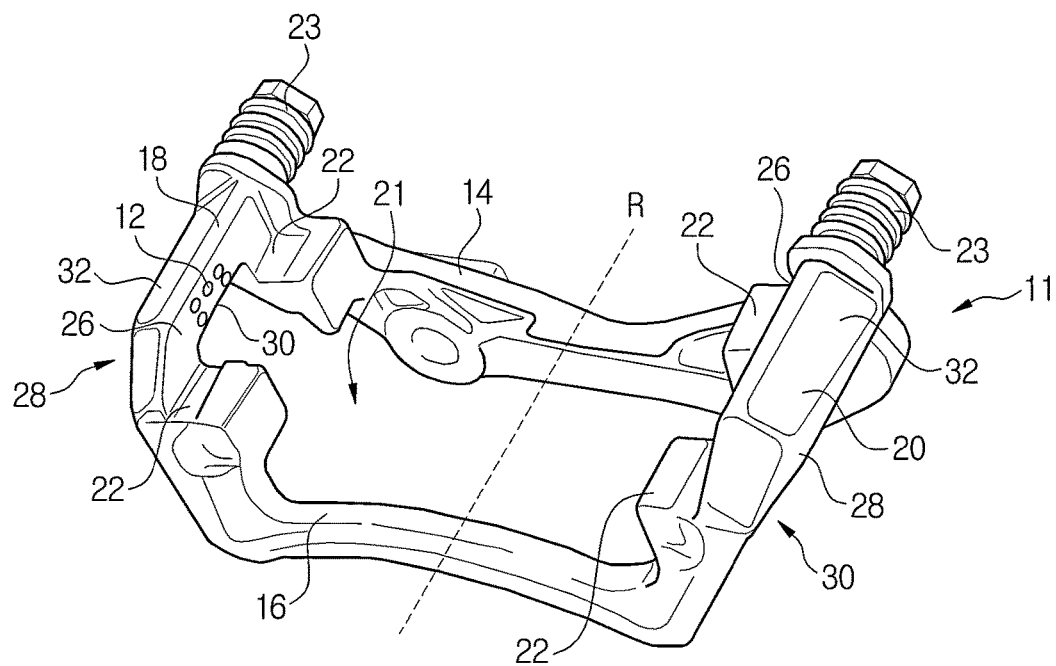
FIGS. 1-4 show a brake carrier according to a first embodiment of the invention.
Figure 2:
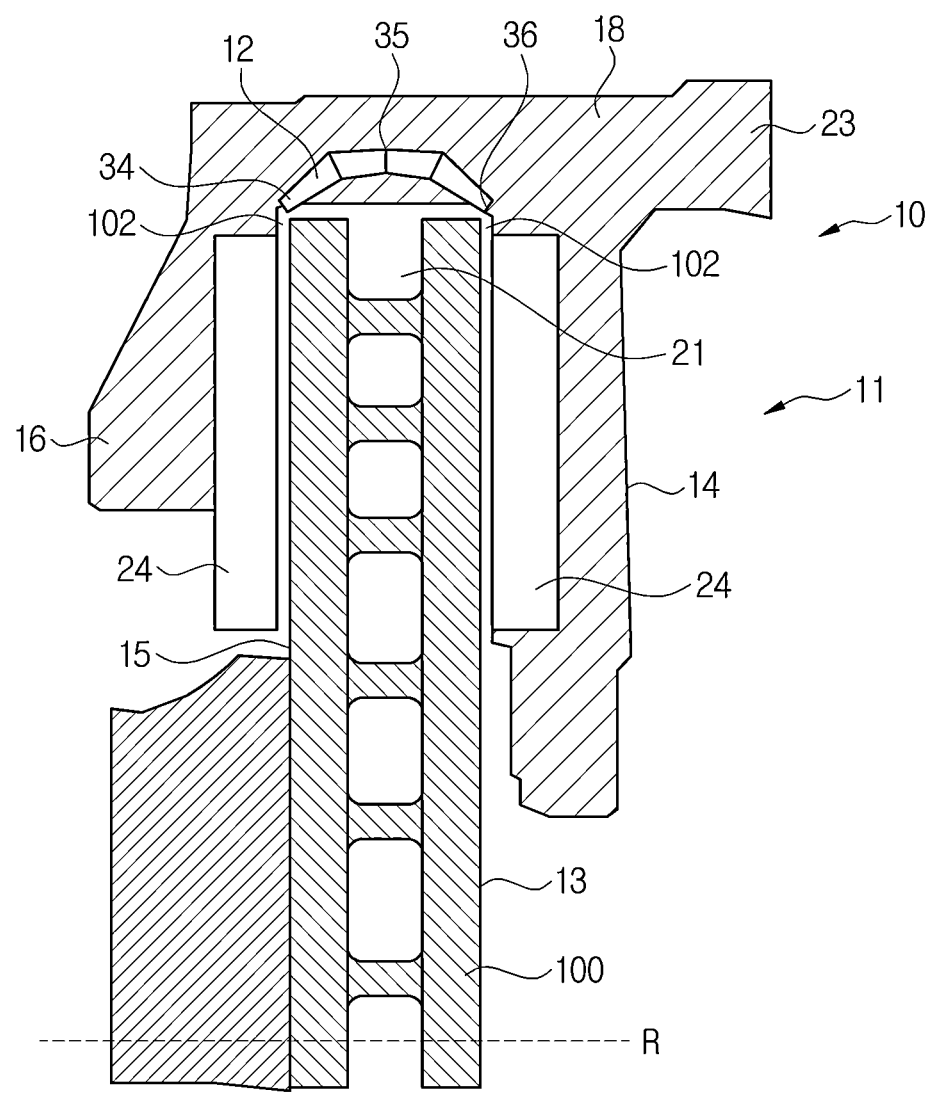

FIG. 1 is a perspective view of a brake carrier 10 according to a first embodiment. The brake carrier 10 has a generally known shape or design, apart from the air receiving channel 12 discussed below. The brake carrier 10 is part of a disc brake arrangement 11 whose further components are illustrated in FIG. 2.

The brake carrier 10 has a first portion 14 and second portion 16. Both of these portions 14, 16 substantially extend in parallel but at a distance to one another. In the shown example, the first and second portion 14, 16 have a U-type shape. The first portion 14 extends along a first side 13 of the brake disc 100 and the second portion 16 extends along a second side 15 of the brake disc 100, the first and second sides 13, 15 forming side faces of the brake disc 100 (see FIG. 2).

The brake carrier 10 also has a first connecting portion 18 and a second connecting portion 20. The first and second connecting portion 18, 20 delete this extend substantially in parallel but at a distance to one another. Further, they extend at similar angles to the first and second portion 14, 16 and in particular substantially orthogonal thereto.

FIG. 1 also depicts a rotation axis R of a brake disc 100 discussed below with respect to FIG. 2. The first and second connecting portion 18, 20 extend substantially in parallel to and/or along the rotation axis R. The first and second portion 14, 20 extend substantially orthogonal thereto.

The first and second portion 14, 20 and the first and second connecting portion 18, 20 jointly confine a space 21 in a frame-like manner in which at least an outer circumferential section of the brake disc 100 and at least part of a pair of brake pads 24 are receivable (see FIG. 2)

In a generally known manner, the brake carrier 10 has four guiding recesses 22 in which guiding projections of brake pads 24 can be received. Moreover, two fixing portions 23 for fixing the brake carrier 10 to an axle knuckle are indicated, the brake carrier 10 thus being immovably fixed within the vehicle. A brake caliper, in particular a floating caliper, for displacing the brake pads 24 is not depicted but can be arranged at the brake carrier 10 in a generally known manner.

The first and second connecting portions 18, 20 each have an inner side 26 facing the respective other connecting portion 18, 20. Outer sides 28 of the first and second connecting portion 18, 20 lie oppositely to and face away from the inner sides 26.

The first and second connecting portion 18, 20 also each have a lower side 30 facing the rotation axis R and/or being positioned close thereto. An upper side 32 of each of the first and second connecting portion 18, 20 faces away from the lower side 30 and/or is positioned at a larger distance to the rotation axis R. The lower side 30 and upper side 32 are connected to one another by the inner and outer sides 26, 28. Merely as an example, this defines a substantially rectangular cross-section of the first and second connecting portions 18, 20.

The extension of an air channel 12 is schematically illustrated by means of a dotted line at one of the inner sides 26 in FIG. 1. The other (right) inner side 26 of the second connecting portion 20 is not visible in FIG. 1, so that a position of a further optional air channel 12 at said inner side 26 is only schematically indicated. In the following, only the channel 12 in the first connecting portion 18 will be discussed, but the optional air channel 12 in the second connecting portion 20 can be configured similarly. This also applies to all of the subsequent second to fourth embodiments.

Figure 3:
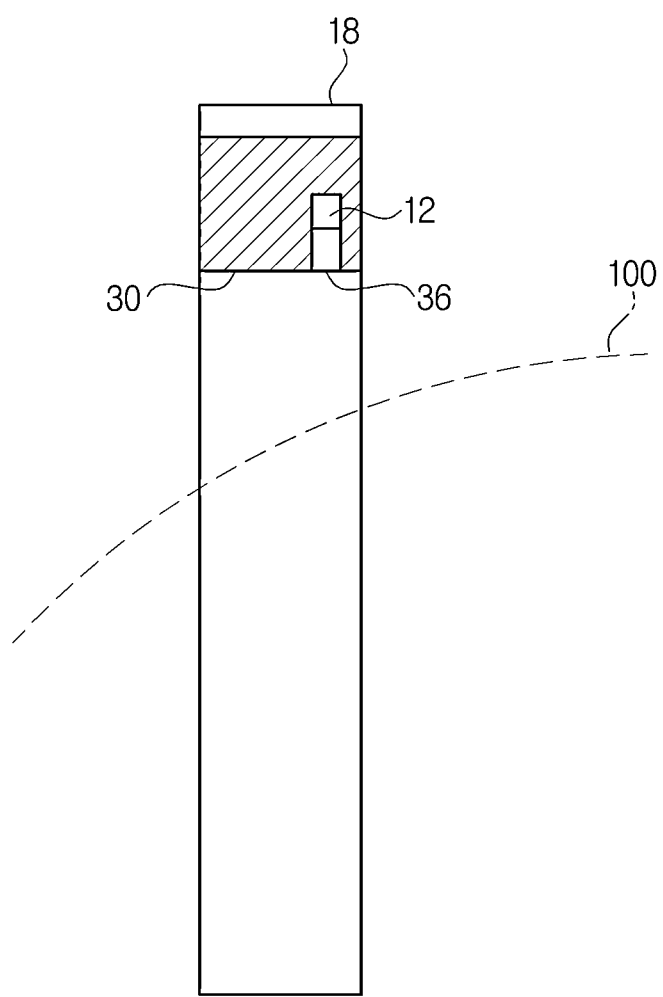

In the example of FIGS. 1-3, the air channel 12 is configured with a closed circumference, thus extending in a tunnel-like manner through a volume of the first connecting portion 18.

FIG. 2 is a sectional view of the brake carrier 10 with a sectional plane extending in parallel to the rotation axis R and longitudinally through first connecting portion 18. FIG. 2 indicates the position of the brake disc 100 (only a part of which is shown) that is partially received in the space 21 surrounded by the brake carrier 100. Further, two brake pads 24 are schematically illustrated as planar members. In a generally known manner, the brake pads 24 extend orthogonally to the rotation axis R of the brake disc 100. Also, they extend from one guiding recess 22 of one connecting portion 18, 20 to an opposite guiding recess 22 of the respective other connecting portion 18, 20.

The brake pads 24 are displaceable along the rotation axis R to clamp the brake disc 100 in between them. In the state of FIG. 2, the brake is not actuated so that the brake pads 24 are arranged at an axial distance to the brake disc 100. Accordingly, a gap 102 extending axially and substantially orthogonally to the rotation axis R is formed between each brake pad 24 and brake disc 100.

When driving, the brake disc 100 rotates together with a non-depicted vehicle wheel. This creates an air flow in the direction of rotation and within each gap 102. At least in existing solutions, this can suck the brake pads 24 towards an opposite surface of the brake disc 100 and generate undesired drag torque.

In the disclosed embodiment, this effect is at least limited, if not completely suppressed, by the air channel 12. Specifically, the air channel 12 (which may also be referred to as being or comprising a nozzle) has a first end 34 and a second end 36. The first and second end 34, 36 are each formed as openings within the solid volume of the first connecting portion 18 face the brake disc 100. Note that a diameter of the brake disc 100 may be larger than a distance of the first and second connecting portion 18, 22 to one another, so that the brake disc 100 may extend beyond of the lower sides 30 of said connecting portions 18, 20, thus lying opposite to the first ends 34 provided in said lower side 30.

In the shown example, the first and second end 34, 36 are each positioned opposite to and/or aligned with one of the gaps 102. Specifically, they are each positioned in a virtual spatial plane extending orthogonally to the rotation axis R and along a respective gap 102.

The first and second end 34, 36 are connected to each other by a channel portion which, merely as an example, has a non-straight angled shape. Further, the first and second end 34, 36 form the lowest diameter sections of the air channel 12. When starting at a respective one of the first and second end 34, 36 a diameter (or a width) of the air channel 12 thus increases towards a centre portion 35 to then decrease again towards the respective other of the first and second end 34, 36.

This generates an air pressure increase in the space 21 at the first and second end 34, 36 and thus near each of the gaps 102. This air pressure counteracts possible suction forces resulting from the rotating brake disc.

FIG. 3 is a schematic cross-sectional view of the first connecting portion 18 with the sectional plane extending orthogonally to the rotation axis R. The sectional plane is further located near the second end 36 of the air channel 12. One can see that the air channel 12 extends within a volume of the first connecting portion 18 and the first end 36 forms an opening to the air channel 12 at the lower side 30 of the first connecting portion 18. Part of an outer circumference of the brake disc 100 is indicated with a dotted line in FIG. 3. The second end 36 (much like the non-depicted first end 34) faces said circumference.

Figure 4:
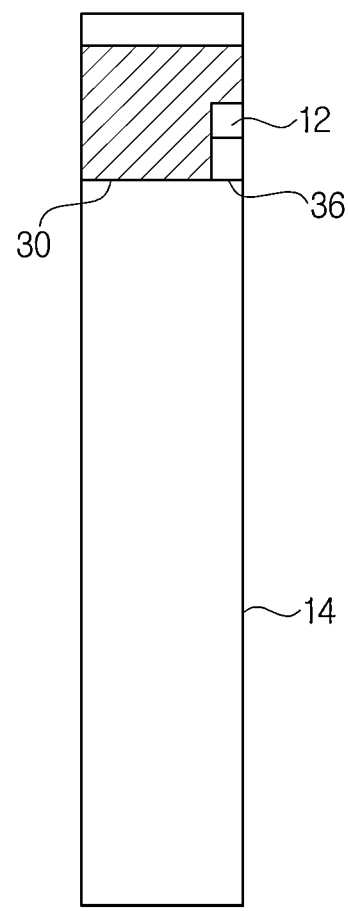

FIG. 4 is a view similar to FIG. 3 and showing an alternative configuration of the air channel 12. This air channel 12 is shaped and sized similar to the example of FIGS. 1-3 but has an open circumference. Specifically, it is formed as a recess with a surface of the first connecting portion 18 and in particular the inner side 26 thereof. Its first and second ends 34, 36 are positioned similar to FIG. 2 with respect to the brake disc 100 and the gaps 102. Thus, air can be received by the channel 12 to create the same anti-suction effect discussed with respect to FIGS. 1-3.

FIGS. 5-8 show a further embodiment wherein the views of said FIGS. correspond to those of FIGS. 1-4. In this case, two separate air channels 12 are provided at the first connecting portion 18 and optionally also at the second connecting portion 20 (not indicated in FIG. 5). Alternatively, only one of the air channels 12 may be provided in one or both of the connecting portions 80, 20.

Figure 6:
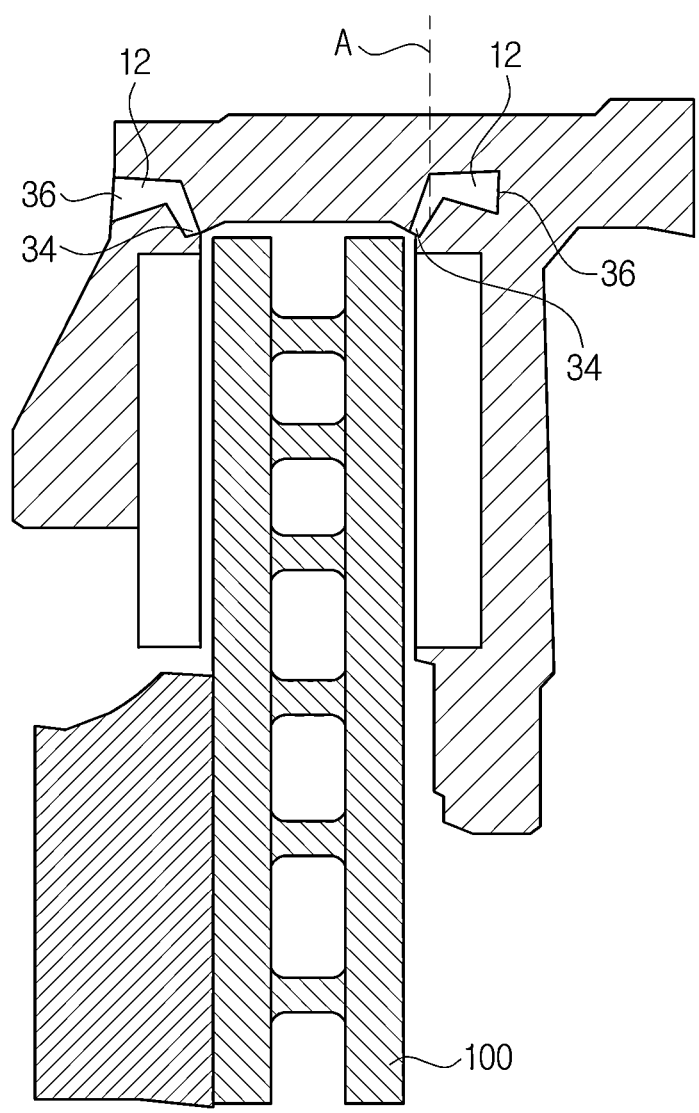

Each air channel 12 has a first end 34 that is positioned similar to the ends 34, 36 of the first embodiment, i.e. opposite one the gaps 102 (see FIG. 6). Each air channel 12 has a second end 36 that is positioned at a larger (in particular axial) distance to and does not face the brake disc 100 and gaps 100. Both ends 34, 36 form openings and are connected by the air channel 12. By way of example, the air channel 12 has an angled course. Also, a dimension of the first end 34, such as a diameter or width, is smaller than that of the second end 36. For example, the width or diameter may increase continuously or in steps from the first end 34 to the second end 36.

In FIG. 6 and when configured in tunnel like-manner with a closed cross-section, the second end 36 of the left air channel 36 opens to a front face of the connecting portion 18 and/or of the brake carrier's second portion 16. The second end 36 of the right air channel 12 opens to a surface of the inner side 26 of the first connecting portion 18. Other than that, the air channel 12 extends below of said surface between the first and second ends 34, 36.

Figure 7:
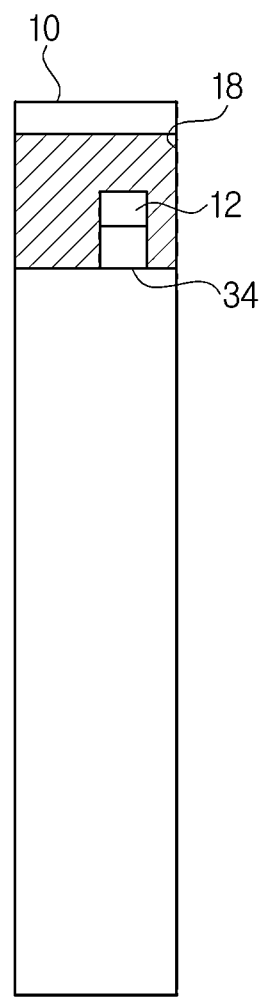

FIG. 7 is a schematic cross-sectional view with the sectional plane extending along line A of FIG. 6. Only part of the brake carrier 10 as shown and members other than the brake carrier 10 are not included. It is not specifically indicated that a width of the first end 34 may be reduced compared to the remainder of the air channel 12, even though this may be implemented accordingly (see FIG. 6).

Figure 5:
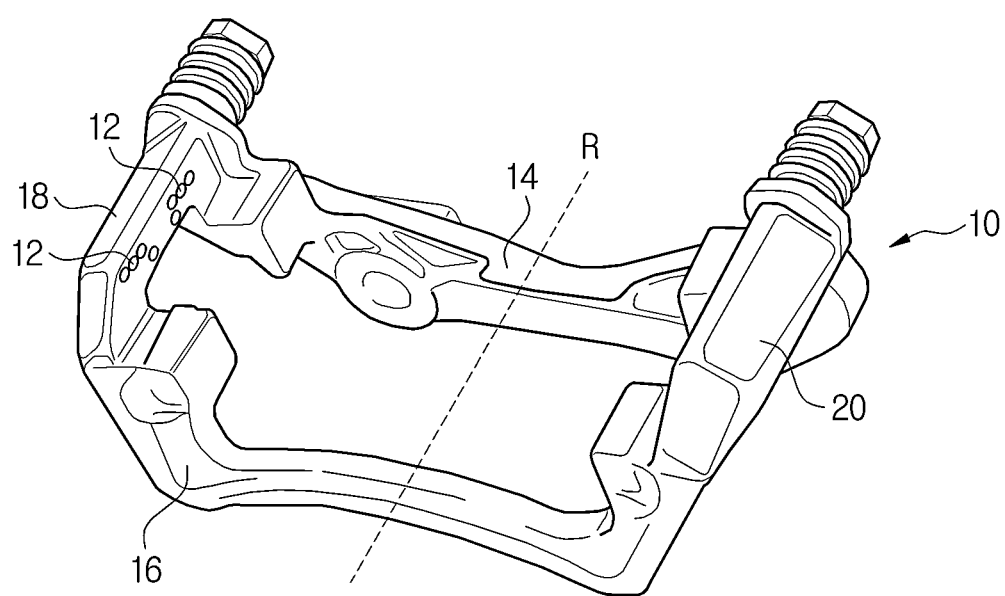
FIGS. 5-8 show a brake carrier according to a second embodiment of the invention.
Figure 8:
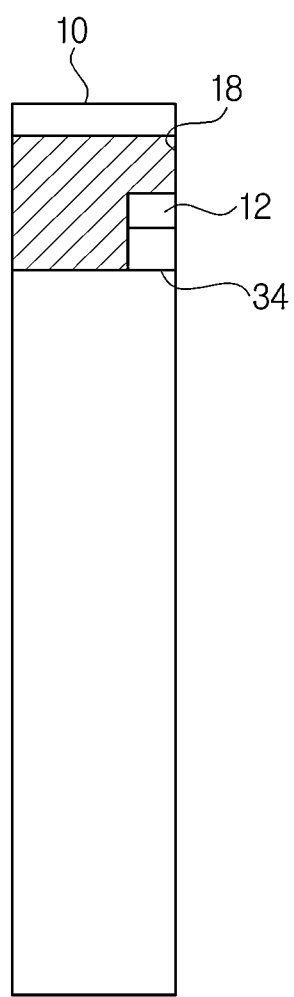
Figure 9:
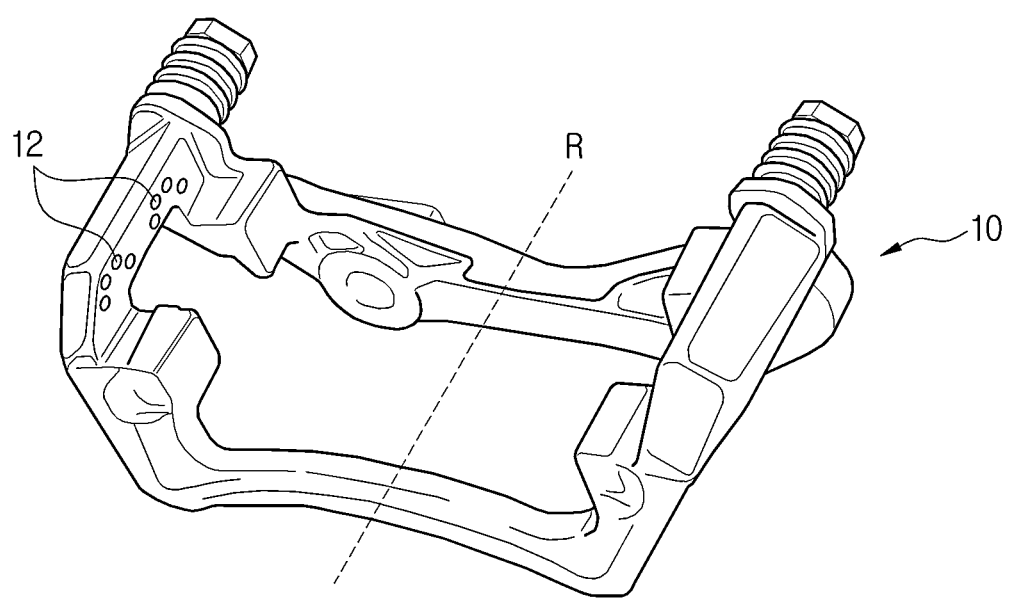
FIGS. 9-12 show a brake carrier according to a third embodiment of the invention.

FIG. 8 is a view similar to FIG. 7 but with the channel 12 being formed as a recess within a surface of the first connecting portion 18. Such a channel may be similarly arranged and sized as is indicated in FIG. 5.

FIGS. 9-12 show a further embodiment wherein the views of said Figures correspond to those of FIGS. 1-4 and 5-8. The air channels 12 are configured similar of those of e.g. FIG. 6 in that two separate air channels 12 are provided that extend in axial opposite directions (e.g. when viewed from the respective first ends 34). A difference to the second embodiment exists in the exact course of the channels 12, which in this third embodiment includes more and longer sections extending at angles relative to one another. This creates an even larger local air pressure increase at an outside of the first ends 34 of the air channels 36 because air can only stream slowly into and along the channels 12.

Figure 10:
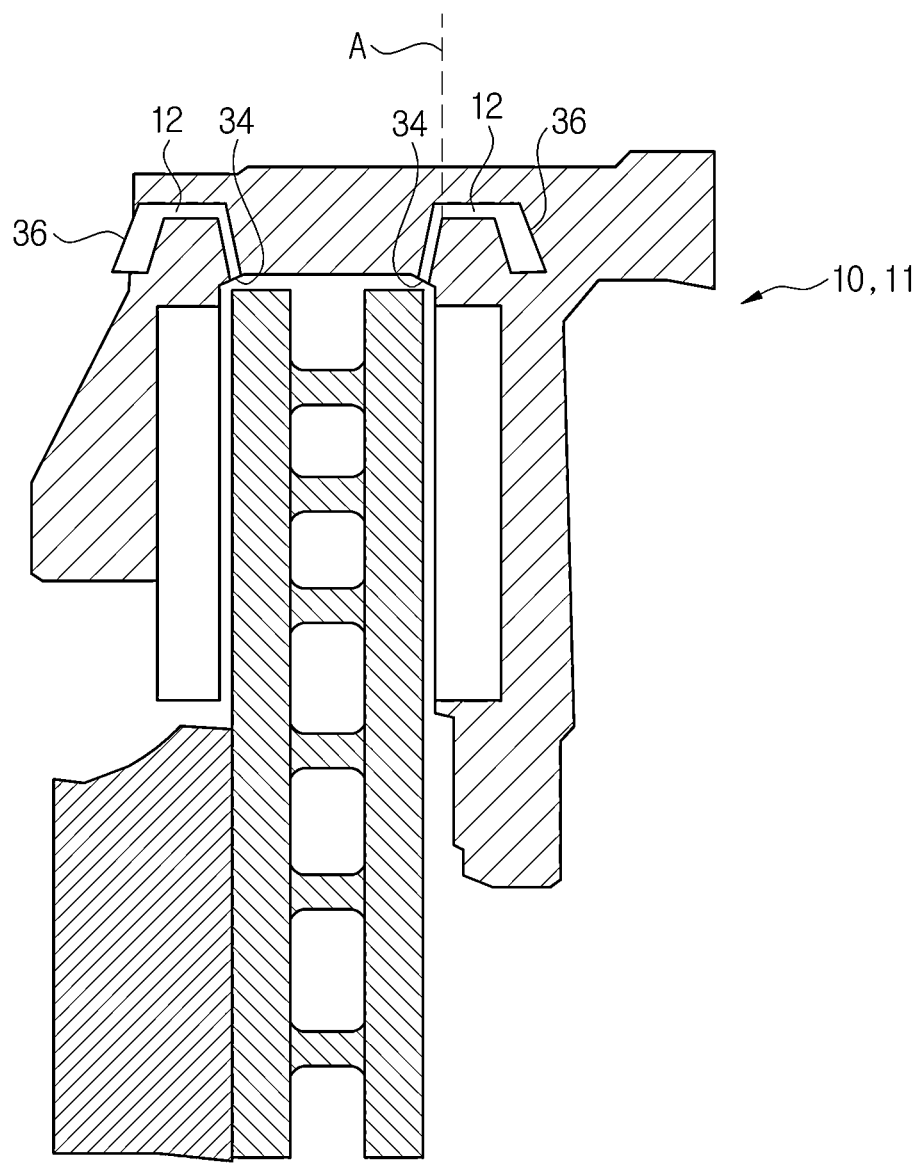
Figure 11:
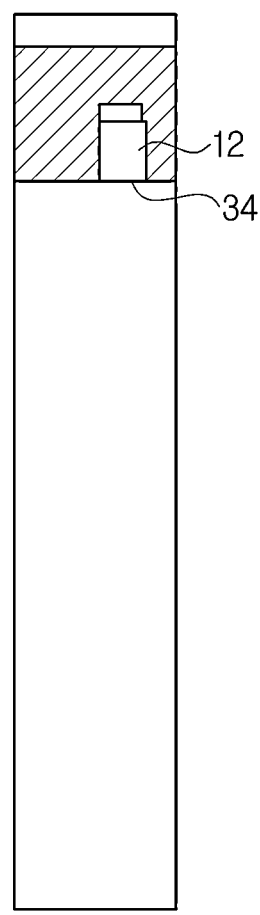
Figure 12:
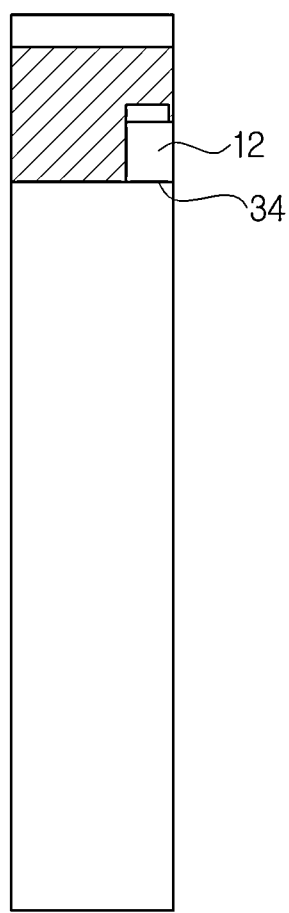

FIGS. 11 and 12 are schematic cross-sectional view similar to FIGS. 7 and 8, with the sectional plane extending along line A of FIG. 10. FIG. 11 shows a tunnel configuration of the air channel 12 and FIG. 12 shows the recess configuration.

Figure 13:
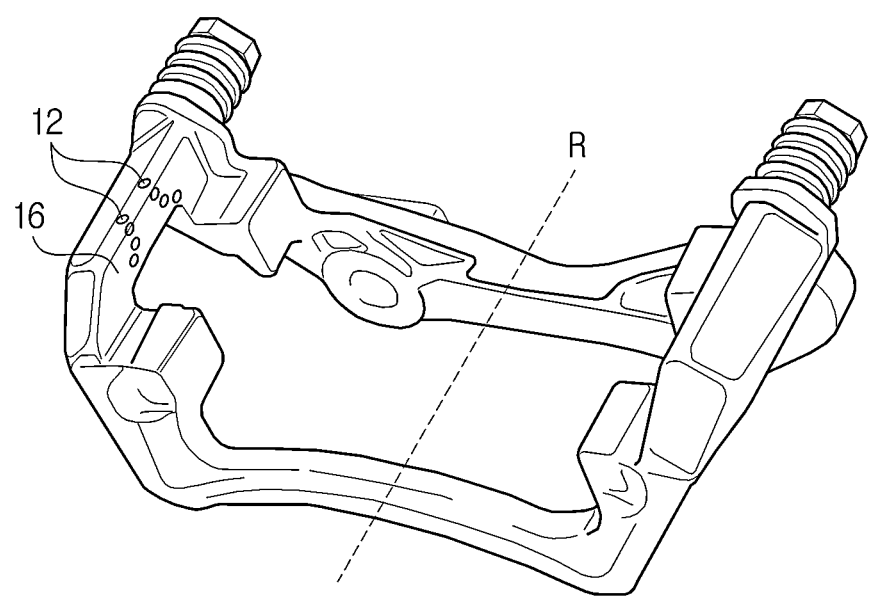
FIG. 13-16 show a brake carrier according to a fourth embodiment of the invention.
Figure 14:
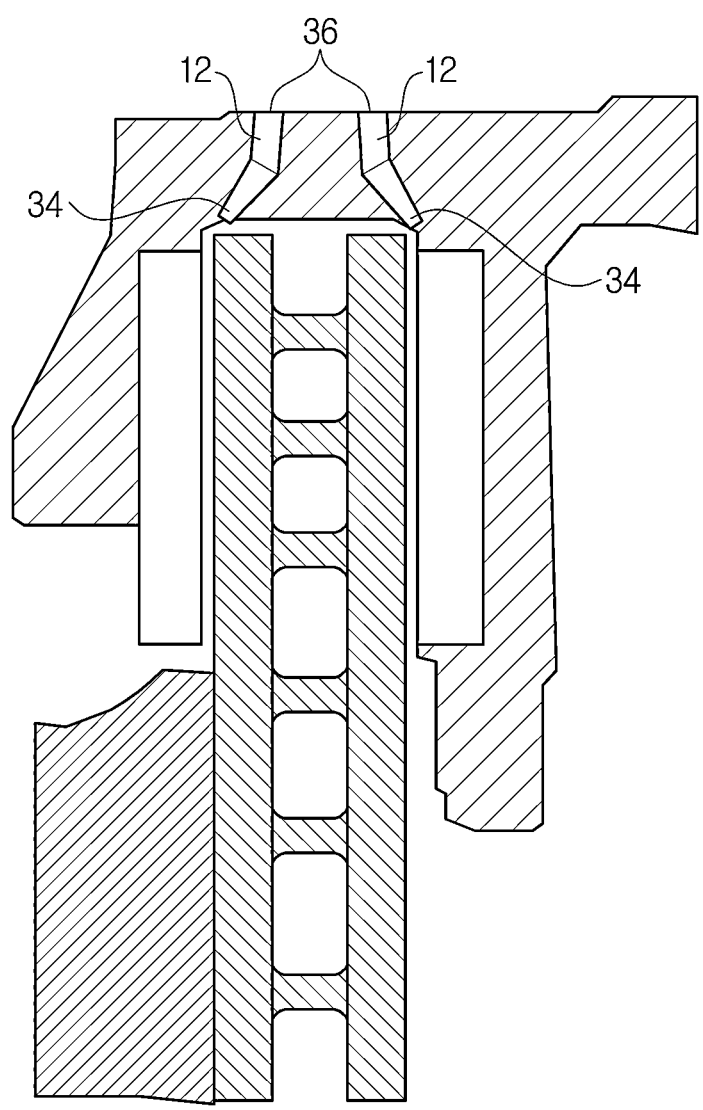
Figure 15:
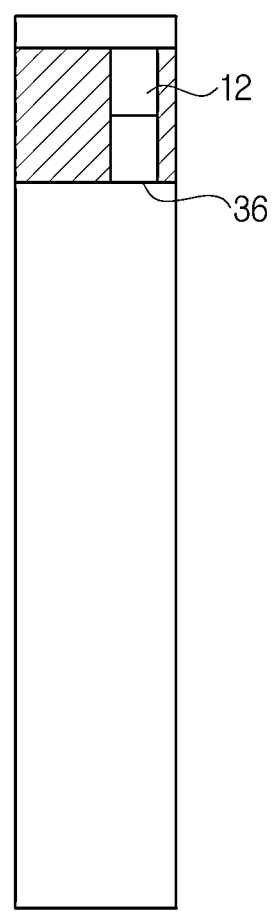

FIGS. 13-15 show a further embodiment wherein the views of said Figures correspond to those of FIGS. 1-4, 5-8 and 9-12.

Again, two separate air channels 12 are provided. These differ from the examples of FIGS. 5-8 and 9-12 in that they extend substantially radially and from the lower side 30 to the upper side 32. Accordingly, the respective second ends 36 are formed at the upper side 32 of the connecting portion 18. The air channels 12 are depicted with an angled course but could also be straight. Similar to the previous embodiments, a diameter or width optionally widens from the first end 34 towards the second end 36.

Figure 16:
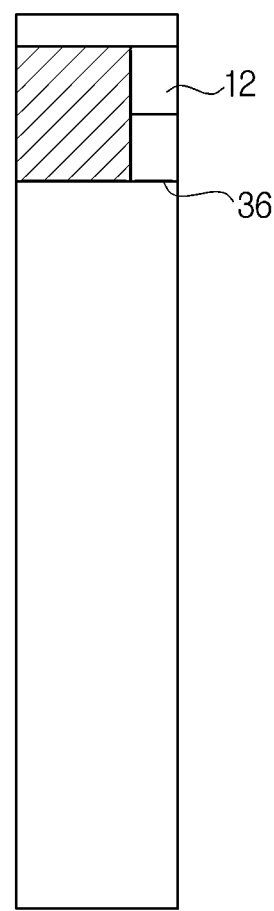

FIGS. 15 and 16 are schematic cross-sectional view similar to FIGS. 7 and 8, with FIG. 15 showing a tunnel configuration of an air channel 12 and FIG. 16 showing a recess configuration.

What is claimed is:

1. A Brake carrier for disc brake arrangement (11), the disc brake arrangement having brake pads that are displaceable relative to a brake disc,
    wherein the brake carrier is configured to support the brake pads during their displacement;
    wherein the brake carrier comprises at least a first portion that is arrangeable on a first side of the brake disc, a second portion that that is arrangeable on a second side of the brake disc and two connecting portions each connecting the first and second portions;

wherein at least one of the connecting portions comprises an air channel having a first end that is arranged so as to face towards the brake disc; and wherein the air channel has a second end facing towards the brake disc, the first and second ends being fluidically connected by the air channel.

2. The brake carrier of claim 1,
wherein at least a section of the air channel is configured as a recess in a surface of the brake carrier.

3. The brake carrier of claim 1,
wherein at least a section of the air channel has a closed circumference.

4. The brake carrier of claim 1,
wherein a cross-section of the air channel decreases towards the first end.

5. The brake carrier of claim 1,
wherein the first end is positioned adjacent and/or opposite to a gap between brake pad and brake disc.

6. The brake carrier of claim 1,
wherein the air channel has a non-straight course, in particular an angled course.

7. The brake carrier of claim 1,
wherein a cross-section of the air channel increases towards the second end.

8. Disc brake arrangement comprising:
a brake carrier according to claim 1;
a pair of brake pads slidably supported by the brake carrier;
a brake disc to be braked by the brake pads.

* * * * *